United States Patent [19]

Ackley et al.

[11] Patent Number: 4,548,626
[45] Date of Patent: Oct. 22, 1985

[54] PARTICULATE AIR FILTER ASSEMBLY

[75] Inventors: Mark W. Ackley, E. Aurora; Brian D. Szafranski, Lancaster, both of N.Y.

[73] Assignee: Figgie International Inc., Willoughby, Ohio

[21] Appl. No.: 605,587

[22] Filed: Apr. 30, 1984

[51] Int. Cl.⁴ .................... B01D 50/00; B01D 46/10
[52] U.S. Cl. ......................................... 55/316; 55/498; 55/521; 55/DIG. 35; 210/493.5; 128/201.25; 128/206.17
[58] Field of Search ......... 55/316, 498, 521, DIG. 33, 55/DIG. 35; 210/493.1, 493.5; 128/201.25, 206.17

[56] References Cited

U.S. PATENT DOCUMENTS

| | | |
|---|---|---|
| 2,652,828 | 9/1953 | Matheson ............... 55/DIG. 35 |
| 2,744,525 | 5/1956 | Whipple ................. 55/DIG. 35 |
| 2,980,208 | 4/1961 | Neumann . |
| 3,026,967 | 3/1962 | Stevens et al. . |
| 3,202,150 | 8/1965 | Miller . |
| 3,279,616 | 10/1962 | Bourdale . |
| 3,490,211 | 1/1970 | Cartier . |
| 3,803,817 | 4/1974 | Lewis . |
| 3,944,403 | 3/1976 | Simpson et al. ................ 55/316 |
| 4,007,026 | 2/1977 | Groh ........................ 55/521 |
| 4,015,114 | 3/1977 | Paajanen et al. ............ 55/316 |

FOREIGN PATENT DOCUMENTS

| | | |
|---|---|---|
| 655223 | 4/1933 | Fed. Rep. of Germany . |
| 336265 | 6/1971 | Sweden . |
| 436668 | 12/1974 | U.S.S.R. ..................... 210/493.1 |

Primary Examiner—David L. Lacey
Attorney, Agent, or Firm—Christel, Bean & Linihan

[57] ABSTRACT

A high efficiency particulate air filter assembly (10) having low air flow resistance. The filter assembly (10) includes a radially pleated filter element (20) having a number of pleats generally equal to 14 times the numerical value of the diameter in inches plus 5 times the numerical value of the diameter divided by the square root of the pleat height, thus $$N = 14d + \frac{5d}{\sqrt{h}}.$$

The filter element (22) is mounted within a canister shell (24) having an end face (42) so designed that a negative fit test may be readily performed.

9 Claims, 9 Drawing Figures

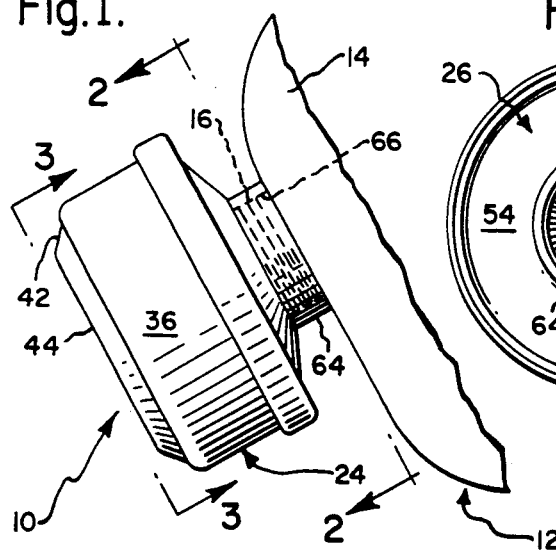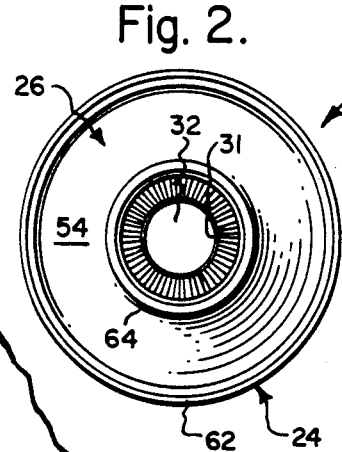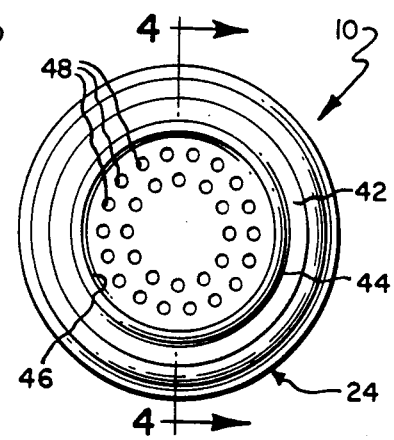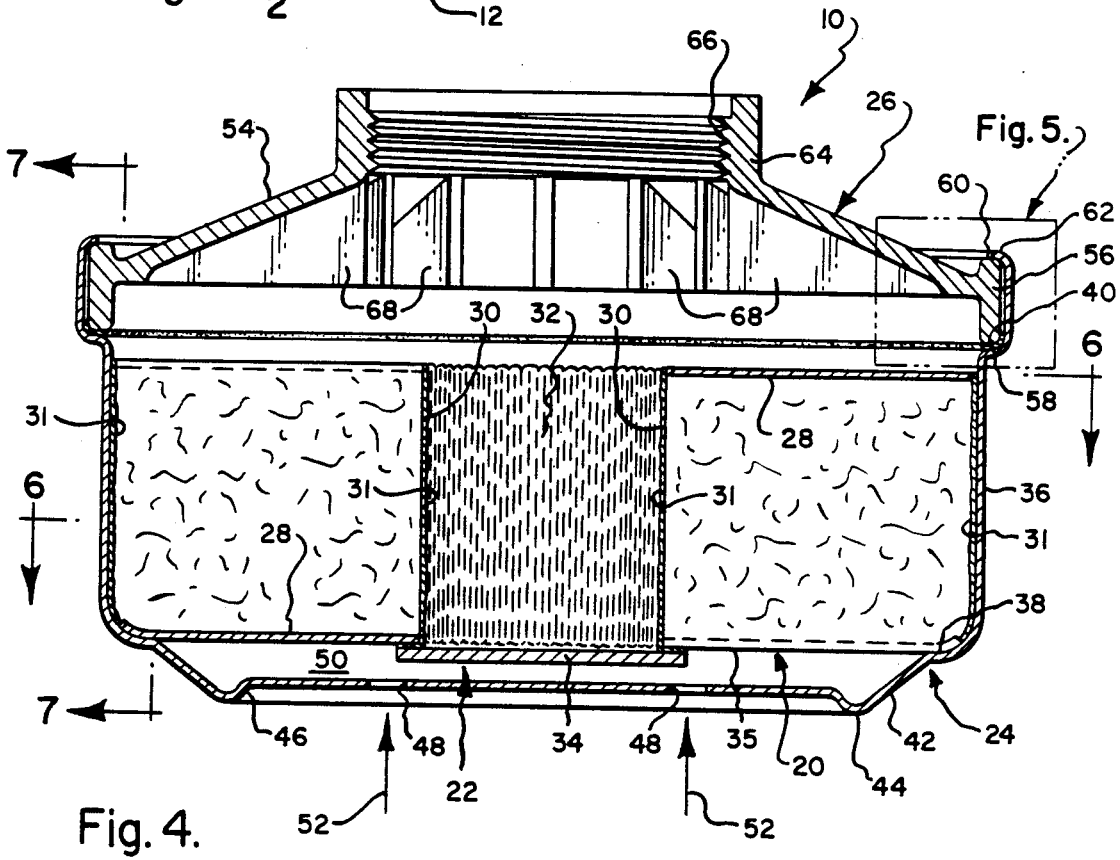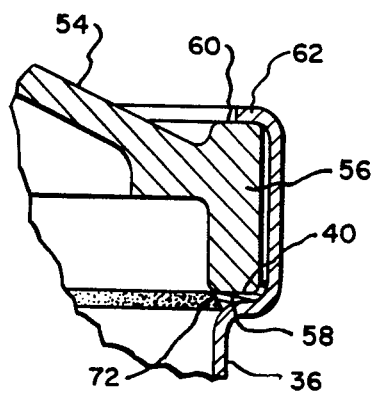

Fig. 6.
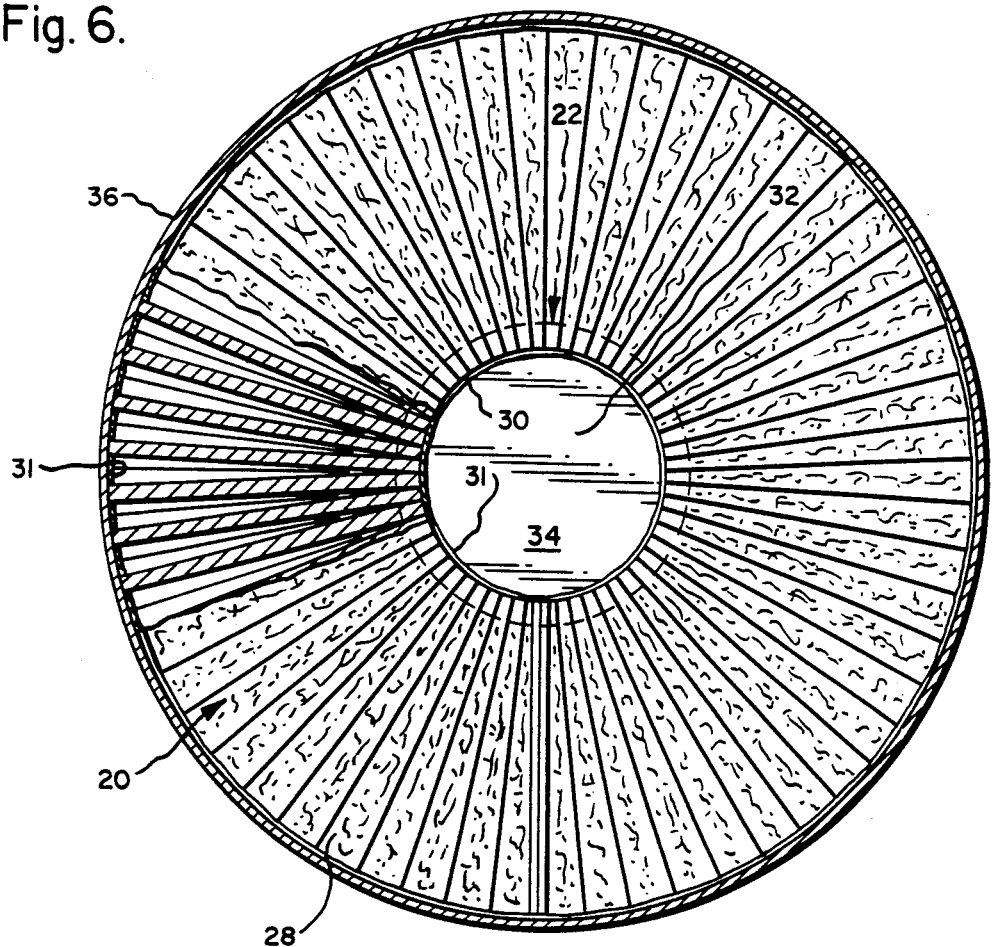
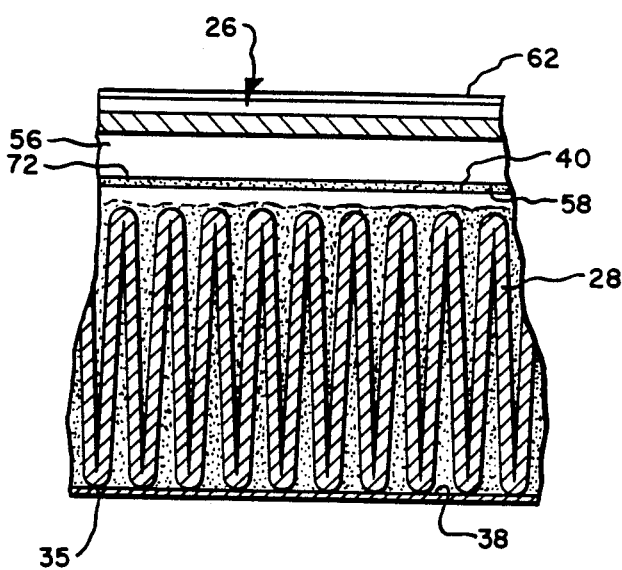
Fig. 7.

PARTICULATE AIR FILTER ASSEMBLY

FIELD OF THE INVENTION

The present invention relates generally to particulate air filter assemblies, and more particularly to high efficiency particulate air filter assemblies of the type shown in U.S. Pat. No. 3,803,817 wherein the air flow resistance is minimized.

BACKGROUND OF THE INVENTION

Various types of respirators are in common use today. These various respirators can be classified as self contained or air purifying. A self contained respirator has its own air supply and, as these devices are expensive, heavy, and have a limited operational time period, they are not commonly used where air purifying respirators can be utilized. Such air purifying respirators are designed to remove particulates and/or gases and vapors. A particulate filter customarily has a filter medium in which the airborne particles are trapped. When designing such filters, it is necessary to be concerned with the service life of the filter, its pressure drop, and its efficiency. Industry has accepted certain standards, such as those established by the National Institute for Occupational Safety and Health. In order to have a high efficiency particulate air filter certified by NIOSH, it must be capable of filtering out 99.97% of the particulates from a given test sample. It should be appreciated that there may be a substantial pressure drop across such a filter. In respiratory filters of the air purifying type, it is desirable that the pressure drop be minimized. Thus, if the wearer of a respirator has to exert undue breathing effort to have the gases pass through the filter media, the wearer rapidly becomes tired. Furthermore, in order to achieve certification for approval from the NIOSH, such a filter, or combination of filters, must pass 85 liters of atmospheric gases per minute with a minimal pressure drop. Ideally the pressure drop should be as low as possible.

One form of filter is shown in U.S. Pat. No. 3,803,817. This form of filter is referred to in the industry as a radially pleated filter. Such radially pleated filters can meet the high efficiency particulate air filter requirements of the National Institute for Occupational Safety and Health, but it is desirable that their air flow resistance be lowered. This is particularly important when such a filter is associated with a sorbent bed filter, as the two filters working in series may have an unacceptably high pressure drop.

As a general rule pressure drop is a function of filter area. Thus, pressure drop can be minimized by increasing the filter area. In a radially pleated filter it would appear that the area can be increased by increasing the number of pleats. However, there is a practical limit to this since as the number of pleats increase, the central opening within the filter must also of necessity increase. The maximum number of pleats for a particular filter diameter to achieve the greatest filter area can be determined from the following formula:

$$n = \pi d / 4t$$

where d equals the filter diameter, t equals the filter thickness, and n equals the number of pleats. However, it has been found that when filters are constructed in accordance with this formula that they do not have the lowest possible air flow resistance. Thus, it is believed that as the filter area approaches its maximum amount that the filter pleats are sufficiently close together that as the air moves across the face of the pleats there is frictional resistance to the movement of the air thereby increasing the pressure drop required for transmission of air through the filter.

OBJECTS AND SUMMARY OF THE INVENTION

It is an object of the present invention to provide a radially pleated filter having minimal air flow resistance.

More particularly, it is an object of the present invention to provide a high efficiency particulate air filter assembly which has minimal air flow resistance.

It is a further object of this invention to provide a filter assembly including an annular filter element of radial pleat design having minimal air flow resistance, the radial pleat filter element being disposed within a novel canister which facilitates negative fit tests.

The foregoing objects and other objects and advantages of this invention will become more apparent from a consideration of the following detailed description taken in conjunction with the accompanying drawings in which preferred forms of this invention are illustrated.

BRIEF DESCRIPTION OF THE FIGURES

FIG. 1 is a side view of one form of a high efficiency particulate air filter assembly made in accordance with the principles of this invention, the filter being mounted on one side of the face mask of a respirator.

FIG. 2 is an end view of the filter assembly as shown in FIG. 1, this view being taken generally along the line 2—2 in FIG. 1.

FIG. 3 is a view of the other end of the filter assembly, this view taken generally along the line 3—3 in FIG. 1.

FIG. 4 is a section taken through the filter assembly along the line 4—4 in FIG. 3.

FIG. 5 is an enlarged detail view of the portion indicated in FIG. 4.

FIGS. 6 and 7 are sections taken generally along the line 6—6 and 7—7 in FIG. 4.

DETAILED DESCRIPTION

Figure 8:
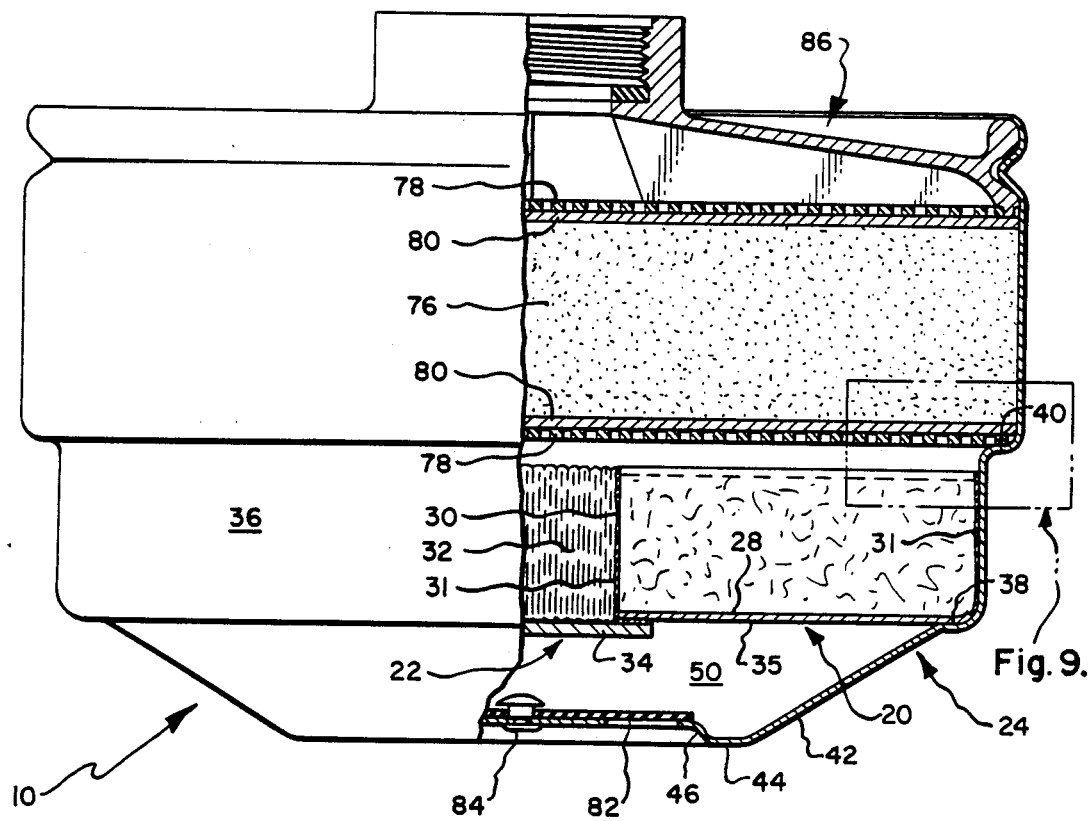
FIG. 8 illustrates another form of filter assembly, this form being capable of filtering both particulates and gases and vapors.

Referring now in detail to FIGS. 1 through 7, a filter assembly, indicated generally at 10, is shown attached to a respirator, indicated generally at 12. The respirator 12 includes the usual face mask 14, preferably formed of rubber or any other suitable material shaped to conform to the contour of the user's face to at least enclose the nose and mouth of the user. The mask 14 is provided with a substantially rigid externally threaded fitting 16 to which the filter assembly may be releasably secured.

The filter assembly consists essentially of four major components. The first of these is a filter element, indicated generally at 20, the filter element being formed from a relatively thin filter media folded to provide a number of circumferentially spaced radially extending pleats, the inner edges of the pleats being bonded together to define a central opening therein. Other major components of the filter assembly are closure means, indicated generally at 22, for closing the central opening in the filter element, a canister shell, indicated generally at 24, and an apertured cover, indicated generally at 26 which cooperates with the canister shell to enclose the filter element within the canister shell.

As previously noted, the filter element is formed from a relatively thin filter media 28, for example Hollingsworth and Vose Filter Media HB-5054 which has an average measured thickness of 0.0225 inches. This filter media is folded in the manner indicated to provide a plurality of radially extending fold lines when mounted within the canister shell 24. The inner edges 30 of the filter media, after folding, are bonded together by any suitable adhesive 31 to form a central opening 32 within the filter element.

The closure means 22, which as illustrated, is in the form of an impervious disk 34, is bonded to one end 35 of the filter over the central opening.

The canister shell is of generally cup-shaped configuration and has a cylindrical portion 36 disposed between axially spaced apart annular first and second steps 38, 40, respectively. In addition, the canister is provided with an apertured end face 42 which is provided with an annular rib 44 and a central recess 46 disposed within the annular rib. Only the central recess 46 is provided with apertures, and to this end, as can be seen from FIG. 3, thirty equally spaced apart apertures 48 are formed therein. The end face 42 is spaced away from the adjacent end 35 of the filter element a distance sufficient to form a plenum chamber 50 between the end face 42 and the adjacent end of the filter to provide for even distribution of incoming air over the filter element 20, the incoming air being indicated by the arrows 52.

The apertured cover 26 is an integral plastic element which can be formed in a variety of ways, such as for example by injection molding. The cover has a dome shaped portion 54 which terminates on its outer edge in an annular peripheral bead or shoulder 56 having axially opposed first and second surfaces 58, 60, respectively. The first surface 58 of the shoulder 56 is disposed adjacent the second step of the canister shell 24. When the parts are assembled, and end portion 62 (FIG. 5) of the canister shell contacts the second surface of the bead to secure the cover to the canister shell. The cover is additionally provided with an integral tubular fitting 64 which is integral with the dome shaped portion, the tubular fitting being provided with internal threads 66 to facilitate the assembly of the filter assembly 10 onto the fitting 16 of the face mask. In addition, it should also be noted that the cover is provided with ribs 68 which extend inwardly from the shoulder 56 towards the opening defined by the threaded fitting 64.

To assemble the structure described thus far, after the inner edges 30 of the pleats have been bonded together the define a central opening, and after the closure means has been glued or otherwise secured to the pleats to block the passage of air through the central opening, the filter element is then mounted within the canister shell. To this end, the cylindrical portion 36 of the canister is sprayed with an adhesive 31 and the filter element is dropped within the canister until the end 35 of the filter element contacts the first step 38. At this point the pleats should be evenly spaced about the filter element. After the adhesive has properly cured, the assembly is inspected to insure that no air can pass between the filter element and the canister or through the central opening. In the event that the assembly described thus-far passes inspection, the cover is then mounted on the canister. To this end, a sealing compound 72 is applied to the radially outwardly extending portion of the second step, the peripheral rim 56 of the cover 26 is forced down onto the second step into intimate contact with the sealing compound, and then the end portion 62 of the canister is crimped over the bead to contact the second surface 60 by a suitable crimping tool.

In the embodiment just discussed, the filter element has a diameter of 3.21 inches, and a pair of filter elements of this construction are conventionally associated with the face mask 14 of a respirator, one to each side of the medial plane of the respirator, and thus each one of these filter or assemblies conventionally receives only one-half of the air required by the wearer of the respirator. A somewhat differing configuration is illustrated in FIG. 8, and in this configuration only a single filter is utilized with the respirator. In order to maintain acceptable pressure drops, it has been necessary to increase the diameter of the filter element to 4.65 inches.

Figure 9:
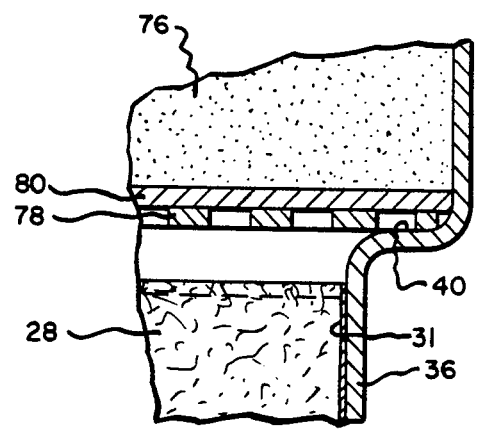
FIG. 9 is an enlarged detail view of a portion of the filter assembly as shown in FIG. 8.

Referring now in greater detail to FIGS. 8 and 9, a chin type canister is illustrated which is capable of removing both particulates and gases or vapors from the air to be breathed. Because of the larger volume of air which must pass through such a canister, and because the air must pass through both a particulate filter 20 and a sorbent bed 76 to remove gases and vapors, air flow resistance requirements become more critical. Thus, not only must the air pass through the radially pleated filter element 20, but must also pass through a sorbent bed 76, which may be of activated charcoal, or some other material selected for the particular vapors and/or gases present in the atmosphere. The sorbent bed is confined between two perforated plates 78 and additionally between two retention filters 80. The canister differs from the previously described canister not only dimensionally, but also in that it is provided with an inhalation valve 82 which is held in place by a rivet 84, thus preventing exhalation through the sorbent material. A novel cover 86 is also provided. As this cover and the method of assembly is the subject of applicants' copending patent application Ser. No. 605,588 filed Apr. 30, 1984, it will not be described in detail. However, it should be noted that the cover is provided with an annular groove and a portion of the canister adjacent the end spaced away from the apertured end face 42 is swaged and sealed into the groove to hold the various parts together.

When developing the filters illustrated in FIGS. 1 through 7 and also in FIGS. 8 and 9, a primary concern has been to minimize the pressure drop across the filter element 20. Theoretically, the minimum pressure drop is expected at the maximum filter area. It has been determined through extensive testing of which the following ten tables are representative that the optimal

TABLE I

| | 4.95" diameter filters 85 1 pm airflow rate Filter Height of 0.5" | | |
|---|---|---|---|
| No. Pleats N | Pleat Width (cm) | Pleat Area (cm$^2$) | Δ P (in. w.c.) |
| 50 | 5.38 | 683 | 0.685 |
| 60 | 5.20 | 792 | 0.595 |
| 70 | 5.01 | 891 | 0.535 |
| 80 | 4.83 | 981 | 0.500 |
| 90 | 4.65 | 1063 | 0.465 |

TABLE I-continued 4.95" diameter filters
85 1 pm airflow rate
Filter Height of 0.5"

| No. Pleats N | Pleat Width (cm) | Pleat Area (cm²) | Δ P (in. w.c.) |
|---|---|---|---|
| 100 | 4.47 | 1135 | 0.450 |

TABLE II 4.95" diameter filters
85 1 pm airflow rate
Filter Height of 0.75"

| No. Pleats N | Pleat Width (cm) | Pleat Area (cm²) | Δ P (in. w.c.) |
|---|---|---|---|
| 50 | 5.38 | 1024 | 0.415 |
| 60 | 5.20 | 1188 | 0.380 |
| 70 | 5.01 | 1337 | 0.330 |
| 80 | 4.83 | 1473 | 0.305 |
| 90 | 4.65 | 1594 | 0.320 |
| 100 | 4.47 | 1702 | 0.310 |

TABLE III 3.125" diameter filters
42.5 1 pm airflow rate
0.87" high pleats

| No. Pleats N | Pleat Width (cm) | Pleat Area (cm²) | Δ P (in. w.c.) |
|---|---|---|---|
| 40 | 3.24 | 573 | 0.368 |
| 50 | 3.06 | 676 | 0.328 |
| 60 | 2.88 | 763 | 0.323 |
| 70 | 2.70 | 834 | 0.340 |
| 80 | 2.51 | 889 | 0.390 |
| 90 | 2.33 | 927 | 0.527 |
| 100 | 2.15 | 950 | 0.693 |

TABLE IV 3.125" diameter filters
42.5 1 pm airflow rate
1.10" high pleats

| No. Pleats N | Pleat Width (cm) | Pleat Area (cm²) | Δ P (in. w.c.) |
|---|---|---|---|
| 40 | 3.24 | 725 | 0.300 |
| 50 | 3.06 | 855 | 0.284 |
| 60 | 2.88 | 965 | 0.273 |
| 70 | 2.70 | 1054 | 0.317 |
| 80 | 2.51 | 1124 | 0.395 |
| 90 | 2.33 | 1173 | 0.440 |
| 100 | 2.15 | 1201 | 0.751 |

TABLE V 3.125" diameter filters
85 1 pm airflow rate
0.87" high pleats

| No. Pleats N | Pleat Width (cm) | Pleat Area (cm²) | Δ P (in. w.c.) |
|---|---|---|---|
| 40 | 3.24 | 573 | 0.758 |
| 50 | 3.06 | 676 | 0.679 |
| 60 | 2.88 | 763 | 0.664 |
| 70 | 2.70 | 834 | 0.699 |
| 80 | 2.51 | 889 | 0.829 |
| 90 | 2.33 | 927 | 1.123 |
| 100 | 2.15 | 950 | 1.458 |

TABLE VI 3.125" diameter filters
85 1 pm airflow rate
1.10" high pleats

| No. Pleats N | Pleat Width (cm) | Pleat Area (cm²) | Δ P (in. w.c.) |
|---|---|---|---|
| 40 | 3.24 | 725 | 0.596 |
| 50 | 3.06 | 855 | 0.561 |
| 60 | 2.88 | 965 | 0.540 |
| 70 | 2.70 | 1054 | 0.638 |
| 80 | 2.51 | 1124 | 0.800 |
| 90 | 2.33 | 1173 | 0.953 |
| 100 | 2.15 | 1201 | 1.510 |

TABLE VII 4.18" diameter filters
85 1 pm airflow rate
0.39" high pleats

| No. Pleats N | Pleat Width (cm) | Pleat Area (cm²) | Δ P (in. w.c.) |
|---|---|---|---|
| 50 | 4.6 | 456 | 1.19 |
| 60 | 4.4 | 525 | 1.11 |
| 70 | 4.2 | 585 | 0.95 |
| 80 | 4.0 | 632 | 0.98 |
| 90 | 3.9 | 688 | 0.92 |
| 100 | 3.9 | 770 | 0.86 |

TABLE VIII 4.18" diameter filters
85 1 pm airflow rate
0.50" high pleats

| No. Pleats N | Pleat Width (cm) | Pleat Area (cm²) | Δ P (in. w.c.) |
|---|---|---|---|
| 50 | 4.5 | 571 | 0.98 |
| 60 | 4.4 | 677 | 0.88 |
| 70 | 4.3 | 759 | 0.84 |
| 80 | 4.1 | 836 | 0.78 |
| 90 | 3.7 | 854 | 0.75 |
| 100 | 3.7 | 935 | 0.78 |

TABLE IX 4.18" diameter filters
85 1 pm airflow rate
0.75" high pleats

| No. Pleats N | Pleat Width (cm) | Pleat Area (cm²) | Δ P (in. w.c.) |
|---|---|---|---|
| 50 | 4.5 | 866 | 0.64 |
| 60 | 4.4 | 999 | 0.56 |
| 70 | 4.2 | 1118 | 0.51 |
| 80 | 4.2 | 1270 | 0.51 |
| 90 | 3.8 | 1306 | 0.52 |
| 100 | 3.6 | 1384 | 0.44 |

TABLE X 4.18" diameter filters
85 1 pm airflow rate
0.87" high pleats

| No. Pleats N | Pleat Width (cm) | Pleat Area (cm²) | Δ P (in. w.c.) |
|---|---|---|---|
| 50 | 4.4 | 982 | 0.496 |
| 55 | 4.4 | 1080 | 0.483 |
| 60 | 4.3 | 1135 | 0.432 |
| 65 | 4.3 | 1230 | 0.437 |
| 70 | 4.2 | 1292 | 0.417 |
| 75 | 4.2 | 1398 | 0.412 |
| 60 | 4.2 | 1172 | 0.49 |

TABLE X-continued

| | 4.18" diameter filters 85 1 pm airflow rate 0.87" high pleats | | |
|---|---|---|---|
| No. Pleats N | Pleat Width (cm) | Pleat Area (cm²) | Δ P (in. w.c.) |
| 80 | 4.1 | 1464 | 0.47 |
| 90 | 3.7 | 1485 | 0.45 |
| 100 | 3.5 | 1549 | 0.48 | number of pleats of a radially pleated filter to achieve minimum airflow resistance is less than the number required if the filter pleat area were maximized. From the testing conducted, it would appear that, at least within the range of diameters tested, with the filter media employed, and with filter pleat heights running from 0.4 to 1.1 inches, that the optimum number of pleats can be expressed by the following empirically derived formula:

$$N = 14d + \frac{5d}{\sqrt{h}}$$

where d is a numerical value equal to the diameter of the filter element in inches, and h is a numerical value equal to the pleat height in inches. Thus, if this formula is applied to a filter element having a diameter of 3.21 inches and a pleat height of 1.0 inches, it can be seen that the number of pleats should be 61. Similarly, if this same formula is applied to a filter element having a diameter of 4.625 inches and a pleat height of 0.625 inches, it can be seen that the number of pleats should be 94. However, the data suggests that the number of pleats can be more or less than the desired number by an amount equal up to approximately 20% of the calculated value of N, particularly with filters of larger diameters. However, as a general rule, a lower number will be selected as it will reduce the cost of the filter material, and also will not require as much care when assembling. Thus, when assembling a filter element having a large number of pleats, it is extremely important that a relatively uniform spacing be maintained between all of the pleats. Thus, in the examples given the number of pleats for the 3.21 inch diameter filter element may be 60, and the number of pleats for the 4.625 inch diameter filter element may be 80.

Another consideration given to the design of the above described filter assemblies is the need to test for leaks when assembled onto a respirator. This may be done by means of a negative fit test wherein the wearer of the respirator will attempt to inhale while blocking the inlet to the filter assembly. If there is leakage within the system, the wearer of the respirator can sense the leakage while the flow through the air filter is being blocked. In order to facilitate such negative fit tests, the annular rim 44 is so sized that most hands can be utilized to cover it. To this end, consideration has been given to statistical measurements of the breadth and dorsum length of women's hands, and the rim diameter of not more than 2.6 inches has been selected so at least 97.5% of the women can place their palm over the rim to effectively block the ingress of air through the filter and thereby permit negative fit testing with great facility. (The value of 2.6 inches is based upon "Hand Measurements of Men, Women and Children" taken from Dreyfuss, H., *The Measure of Man, Human Factors in Design*, Whitney Library of Design, New, York, 1967.). As a man's hands are typically larger than a woman's, this test can also be performed by an even greater percentage of men.

While preferred embodiments in which the principles of the present invention have been incorporated are shown and described above, it is to be understood that this invention is not to be limited to the particular details shown and described above, but that, in fact, various alternative embodiments may be employed in the broader aspects of this invention. For example, a cover may be provided with an axially extending cylindrical portion of approximately the same diameter as the cylindrical portion of a canister shell, the cylindrical portion of the cover receiving a sorbent type filter, and the cylindrical portion of the canister shell receiving a radially pleated particulate filter, the cover and canister shell being secured together to form a combination filter which is capable of filtering gases, vapors, and particulates.

What is claimed is:

1. A high efficiency particulate air filter assembly having low air flow resistance, said filter assembly comprising:
    an annular filter element having a diameter in the range of 3.0 to 5.0 inches, the filter element being formed from a relatively thin filter media folded to provide a number of circumferentially spaced pleats, the fold lines of which extend radially relative to the axis of the filter element, the inner edges of the pleats being bonded together to define a central opening therein, the pleats having a height from 0.4 to 1.1 inches, and the number (N) of pleats being in the range, said range being defined by $$N = \left( 14d + \frac{5d}{\sqrt{h}} \right) \pm 20\%$$

where "d" is a numerical value equal to the diameter in inches, and "h" is a numerical value equal to the pleat height in inches;
    closure means closing the central opening;
    a canister shell of generally cup-shaped configuration having an apertured end face, an open end, and a generally cylindrical portion disposed between the end face and the open end, the filter element being received within said canister shell and having the outer edges of the pleats bonded to the inner wall surface of the cylindrical portion; and
    an apertured cover, the peripheral edge of the cover being interconnected to said shell adjacent said open end whereby the filter element is enclosed within said canister shell.

2. The filter assembly as set forth in claim 1 wherein the filter media has an average measured thickness of approximately 0.0225 inches.

3. The filter assembly as set forth in claim 1 wherein the filter element diameter is 3.21 inches and the number of pleats is 60.

4. The filter assembly as set forth in claim 1 wherein the filter element diameter is 4.625 inches, and the number of pleats is 80.

5. The filter element assembly as set forth in claim 1 wherein the canister shell further includes a pair of axially spaced apart annular first and second steps, said generally cylindrical portion being disposed between said steps, one end of the filter element being disposed adjacent said first step, and said apertured end face being spaced away from said filter element to form a plenum chamber therebetween.

6. The filter assembly as set forth in claim 5 wherein said end face is provided with an annular rib, and a central recess, only said central recess being provided with apertures.

7. The filter assembly as set forth in claim 6 wherein the diameter of said rib does not exceed 2.6 inches thereby facilitating the performance of a negative fit test.

8. The filter assembly as set forth in claim 5 wherein said apertured cover is an integral plastic element having a peripheral bead having axially opposed first and second surfaces, the first surface of said bead being disposed adjacent the second step, and an end portion of the canister shell contacting the second surface of said bead to hold the cover to said canister shell.

9. The filter assembly as set forth in claim 5 including a sorbent filter bed disposed between said apertured cover and said second step.

* * * * *